United States Patent
Hopaluk et al.

(10) Patent No.: US 7,304,312 B2
(45) Date of Patent: Dec. 4, 2007

(54) ULTRAVIOLET REFLECTING COMPOSITIONS

(75) Inventors: Liane B. Hopaluk, Lowell, MI (US); Farhod G. Baghera, Ada, MI (US); Terry L. Lautzenheiser, Nunica, MI (US); David M. Byrne, Jenison, MI (US)

(73) Assignee: Access Business Group International LLC, Ada, MI (US)

( * ) Notice: Subject to any disclaimer, the term of this patent is extended or adjusted under 35 U.S.C. 154(b) by 223 days.

(21) Appl. No.: 11/221,219

(22) Filed: Sep. 7, 2005

(65) Prior Publication Data

US 2007/0051901 A1 Mar. 8, 2007

(51) Int. Cl.
C02F 1/32 (2006.01)
A61L 2/10 (2006.01)

(52) U.S. Cl. .............. 250/436; 250/423 R; 250/434; 250/428; 250/435; 210/748; 210/753; 210/754; 210/85; 422/37.1; 422/261

(58) Field of Classification Search ............... None
See application file for complete search history.

(56) References Cited

U.S. PATENT DOCUMENTS

| | | | |
|---|---|---|---|
| 3,551,091 A | 12/1970 | Veloz | |
| 3,923,663 A | 12/1975 | Reid | |
| 4,101,777 A | 7/1978 | Reid | |
| 4,615,799 A | 10/1986 | Mortensen | |
| 4,752,401 A | 6/1988 | Bodenstein | |
| 4,762,613 A | 8/1988 | Snowball | |
| 4,769,131 A | 9/1988 | Noll et al. | |
| 4,857,204 A | 8/1989 | Joklik | |
| 4,968,437 A | 11/1990 | Noll et al. | |
| 4,971,687 A | 11/1990 | Anderson | |
| 5,078,876 A | 1/1992 | Whittier et al. | |
| 5,141,636 A | 8/1992 | Flanagan et al. | |
| 5,230,792 A | 7/1993 | Sauska et al. | |
| 5,324,423 A | 6/1994 | Markham | |
| 5,368,826 A | 11/1994 | Weltz et al. | |
| 5,451,791 A | 9/1995 | Mark | |
| 5,529,689 A | 6/1996 | Korin | |
| 5,540,978 A | 7/1996 | Schrenk | |
| 5,547,590 A | 8/1996 | Szabo | |
| 5,573,666 A | 11/1996 | Korin | |
| 5,597,482 A | 1/1997 | Melyon | |
| 5,611,918 A | 3/1997 | Markham | |
| 5,653,877 A | 8/1997 | Mark | |

(Continued)

OTHER PUBLICATIONS

Evden Enterprises, "Solutions for Users," http://www.zeiss.de/us/imt/home.ndf/0/86f036d992ca85da852569df005aa34 Aug. 16, 2004.

(Continued)

Primary Examiner—Jack I. Berman
Assistant Examiner—Zia R. Hashmi
(74) Attorney, Agent, or Firm—Brinks Hofer Gilson Lione

(57) ABSTRACT

Thermoplastic compositions that reflect ultraviolet light are provided herein, along with articles of manufacture and methods of fluid purification using the same. The thermoplastic compositions preferably comprise a suitable thermoplastic material and microparticles of UV reflective material, such as aluminum or stainless steel. The thermoplastic compositions are useful, for example, in forming articles of manufacture comprising a UV reflective surface that are suitable for use in a water treatment system in connection with a UV light source.

20 Claims, 5 Drawing Sheets

U.S. PATENT DOCUMENTS

| | | |
|---|---|---|
| 5,660,719 A | 8/1997 | Kurtz et al. |
| 5,843,309 A | 12/1998 | Mancil |
| 6,037,598 A | 3/2000 | Cicha |
| 6,436,299 B1 | 8/2002 | Baarman et al. |
| 6,451,202 B1 | 9/2002 | Kuennen et al. |
| 6,491,868 B2 | 12/2002 | Kuennen et al. |
| 6,514,420 B2 | 2/2003 | Kuennen et al. |
| 6,524,529 B1 | 2/2003 | Horton, III |
| 6,569,319 B2 | 5/2003 | Kuennen et al. |
| 6,673,250 B2 | 1/2004 | Kuennen et al. |
| 6,716,343 B2 | 4/2004 | Kool et al. |
| 6,726,839 B2 | 4/2004 | Taylor, Jr. |
| 6,740,245 B2 | 5/2004 | Johnson |
| 6,793,817 B2 | 9/2004 | Kuennen et al. |
| 2002/0170816 A1 | 11/2002 | Leffler et al. |
| 2003/0059549 A1 | 3/2003 | Morrow et al. |
| 2003/0170151 A1 | 9/2003 | Hunter et al. |
| 2004/0004044 A1 | 1/2004 | Anderson |

OTHER PUBLICATIONS

Wayne O. Aruda, M.S., M.B.A., "Review of Fluoropolymer Tubing in Photochemical Reactors," http://www.agrenetics.com/page11.html Aug. 10, 2005.

ULTRAVIOLET REFLECTING COMPOSITIONS

The present invention relates to compositions that reflect ultraviolet (UV) radiation, and methods of using the same. The UV reflective compositions may be used, for example, in forming components of water treatment systems and in methods of disinfecting fluids, such as water.

BACKGROUND

Ultraviolet light (UV) can be used to disinfect fluids, such as water. Exposure to ultraviolet light is believed to detrimentally alter the genetic (DNA) material in cells, thereby reducing the population of potentially pathogenic microorganisms such as bacteria, viruses, molds, algae and the like. Typically, water flows past UV lamps in UV disinfection systems thereby exposing microorganisms in the water to a lethal dose of UV energy. Typical water disinfection systems and devices emit UV light at approximately 254 nm, which is believed to penetrate the outer cell membrane of microorganisms, pass through the cell body, reach the DNA and alter the genetic material of the microorganism.

Water purification systems often comprise a source of germicidal UV radiation configured and positioned to irradiate a water sample to be purified. The water sample can be contained in a conduit or chamber of any suitable shape and material to permit exposure of the water to a desired amount of the germicidal UV radiation. For instance, a UV radiation source can be placed adjacent to, or within, a water-containing conduit or chamber. A UV reflective surface can be positioned to reflect UV radiation back toward the water to be purified, to enhance the level of UV radiation within the water sample or to make more efficient use of the UV radiation generated by the source of UV radiation. For example, published U.S. Patent application US 2004/0004044A1, filed Jul. 3, 2002 and published Jan. 8, 2004, and U.S. Pat. No. 5,141,636, filed Jan. 8, 1991, disclose the use of a reflective material such as aluminum foil to reflect UV radiation toward water to be purified. What is needed are compositions to provide a desired level of UV reflectance for use in water treatment systems. Preferably, such compositions are also suitable for direct contact with water to be purified.

SUMMARY

Thermoplastic compositions that reflect ultraviolet light are provided herein, along with articles of manufacture and methods of fluid purification using the same. The thermoplastic compositions are useful, for example, in forming articles of manufacture comprising a UV reflective surface that are suitable for use in a water treatment system. The thermoplastic compositions preferably comprise a suitable thermoplastic material comprising particles of UV reflective material and may be characterized by an initial reflectivity of at least 30% of UV radiation at a wavelength of 254 nm. The thermoplastic composition preferably maintains a reflectivity of at least 30% of UV radiation at a wavelength of 254 nm for a suitable period of time, which is preferably at least 10 hours of continuous or intermittent UV radiation, and more preferably up to 20, 30, 40 hours or more of continuous or intermittent UV radiation. Various thermoplastic compositions can be used. The thermoplastic material is preferably a polypropylene homopolymer, although any thermoformable material having a desired level of resistance to degradation from exposure to UV radiation may be used. The UV reflective material is preferably aluminum, although other UV reflective materials such as stainless steel, or combinations of two or more UV reflective materials, can also be used. The particles of UV reflective material can have any size suitable to provide the desired level of UV reflectivity, but are preferably microparticles, such as microparticles having an average size of about 1 to 100 µm, or more preferably about 15 µm to about 55 µm. The thermoplastic composition can comprise any amount of the UV reflective material to provide the desired level of UV reflectivity, but preferably comprise about 0.5% to about 5% by weight of the UV reflective particles. The thermoplastic compositions are preferably suitable for direct contact with a fluid, such as water. Preferably, contacting a UV reflective thermoplastic composition with a fluid for a period of time desired to purify the fluid does not result in the migration of an undesirable level of impurities from the thermoplastic composition to the purified fluid. In some embodiments For example, when the thermoplastic composition comprises aluminum, contacting water with the thermoplastic composition for a desired period of time results in less than 1.0 ppb of aluminum transferred from the thermoplastic composition to the contacting water.

In one embodiment, fluid treatment systems comprising a UV reflective thermoplastic composition are provided. The fluid treatment system, such as a water treatment system, comprises one or more articles of manufacture in any suitable configuration, that are formed at least in part from a UV reflective thermoplastic composition. In operation, at least a portion of the UV reflective thermoplastic composition in the water treatment system preferably functions to reflect UV radiation into a water sample. For example, a water treatment system can comprise a water conduit having an interior surface comprising a UV reflective thermoplastic composition, positioned and configured to reflect UV radiation toward a water sample subjected to UV radiation from a UV radiation source. Any suitable UV radiation source can be positioned and configured to emit UV radiation into a water sample so as to provide a desired level of decontamination of the water sample. The UV radiation can be provided at one or more desired wavelengths and intensities to provide a desired level of decontamination of the water sample, for example by neutralizing or killing one or more pathogens. The water sample can contact the interior surface of the water conduit, which can be formed from a UV reflective thermoplastic composition, or coated with a layer of the UV reflective thermoplastic composition. Alternatively, a water sample can be contained within a separate conduit that is permeable to UV radiation, and the separate conduit can be maintained adjacent to a UV radiation source and proximate to a surrounding surface comprising a UV reflective thermoplastic composition. The water treatment system preferably comprises one or more articles of manufacture that are substantially entirely formed from a lightweight, durable, low-cost UV-reflective composition.

In another embodiment, methods of purifying a fluid, such as water, are provided that comprise irradiating the fluid with ultraviolet radiation. Irradiation of the fluid can be performed to reduce or eliminate one or more contaminants. The UV radiation is preferably reflected from a UV reflective surface containing the UV reflective thermoplastic compositions.

DETAILED DESCRIPTION

Figure 1:
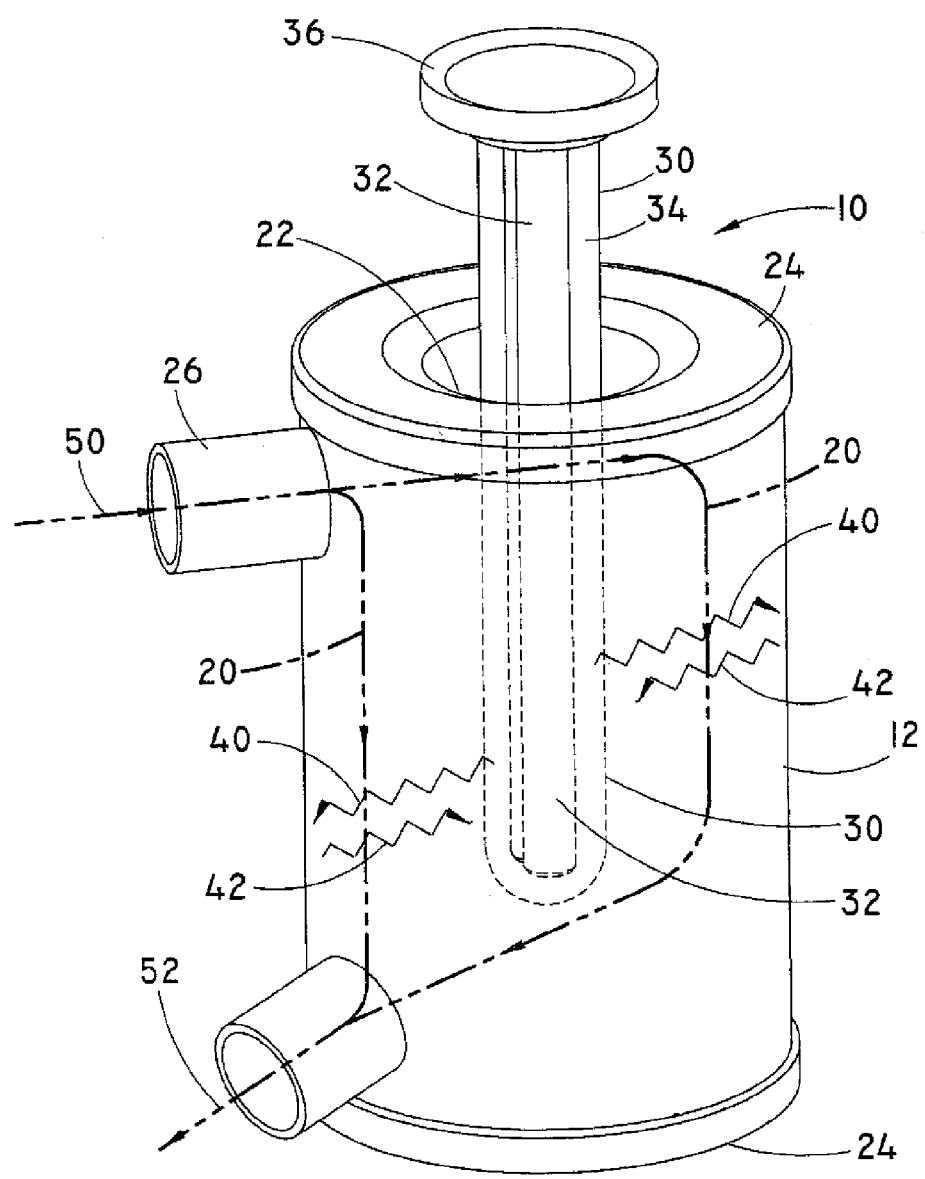
FIG. 1 a cut-away view of a first UV lamp assembly configuration.

Unless otherwise defined, all technical and scientific terms used herein have the same meaning as commonly understood by one of ordinary skill in the art to which this invention pertains. In case of conflict, the present document, including definitions, will control. Preferred methods and materials are described below, although methods and materials similar or equivalent to those described herein can be used in the practice or testing of the present invention. All publications, patent applications, patents and other references mentioned herein are incorporated by reference in their entirety. The materials, methods, and examples disclosed herein are illustrative only and not intended to be limiting.

The term "about" used with reference to a quantity includes variations in the recited quantity that are equivalent to the quantity recited, for instance an amount that is insubstantially different from a recited quantity for an intended purpose or function.

The terms "UV radiation" or "UV light," as used synonymously herein, refers to light with a wavelength in the ultraviolet range. Ultraviolet light is classified into three wavelength ranges: UV-C, from about 200 nanometers (nm) to about 280 nm; UV-B, from about 280 nm to about 315 nm; and UV-A, from about 315 nm to about 400 nm. Generally, UV light, and in particular, UV-C light is "germicidal," i.e., it deactivates the DNA of bacteria, viruses and other pathogens and thus destroys their ability to multiply and cause disease, effectively resulting in sterilization of the microorganisms. Specifically, UV "C" light is believed to cause damage to the nucleic acid of microorganisms by forming covalent bonds between certain adjacent bases in the DNA. The formation of these bonds is believed to prevent the DNA from being opened for replication (dehybridization), and the organism is neither able to produce molecules essential for life process, nor is it able to reproduce. Generally, the inability to produce these essential molecules or the inability to replicate is fatal to an organism. Preferably, UV radiation used for decontamination has a wavelength of between about 250 to about 260 nm, including 254 nm, to provide high germicidal effectiveness. While susceptibility to UV light varies, exposure to UV energy for about 20 to about 34 milliwatt-seconds/cm$^2$ is believed to be adequate to deactivate approximately 99 percent of the pathogens. UV reflectivity is often described herein with respect to UV radiation at a wavelength of 254 nm for illustrative purposes only.

As used herein, the term "thermoplastic material" is intended to mean a polymeric material that softens or melts on heating, and becomes rigid again on cooling. Thermoplastic polymers can exhibit either crystalline or semi-crystalline morphology upon cooling after melt-formation through the use of a mold or like article. The thermoplastic material is selected or adapted to provide a desired level of resistivity to degradation upon exposure to UV radiation. Preferably, the thermoplastic composition is a polypropylene homopolymer. However, other types of thermoplastic polymers include, without limitation, suitable polyolefins (such as polyethylene, polypropylene, polybutylene, and any combination thereof), polyamides (such as nylon), ABS resins, polyurethanes, polyester (such as polyethylene terephthalate), and the like (as well as any combinations thereof).

UV Reflective Thermoplastic Compositions

Thermoplastic compositions that reflect ultraviolet radiation are provided herein. The thermoplastic compositions contain a suitable thermoplastic material and particles of UV reflective material. The composition and configuration of the thermoplastic composition and the UV reflective material can be selected to provide a composition with desired levels of UV reflectivity, and durability for a desired application. The composition of the thermoplastic composition is also preferably selected to be cost-effective, resistant to degradation upon exposure to UV radiation for at least a desired period of time, and suitable for water-contact with potable water.

Preferably, the level of UV reflectivity is adequate to provide a desired intensity of reflected UV radiation within a fluid sample, such as a sample of water. For example, a desired intensity of reflected UV radiation from a thermoplastic composition may provide a germicidal intensity of UV light adequate to decontaminate a water sample, such as 20 to about 40 milliwatt-seconds/cm$^2$, including 20, 25, 30, 35 and 40 milliwatt-seconds/cm$^2$, and any light intensities therebetween. The desired level of reflectivity of a UV reflective thermoplastic composition can vary depending on the configuration of a reflecting surface that includes the UV reflective thermoplastic composition. Preferred UV reflective thermoplastic compositions are characterized by an initial reflectivity of at least 30% of UV radiation at a wavelength of 254 nm upon initial contact with UV radiation. More preferably, UV reflective thermoplastic compositions are characterized by an initial reflectivity of at least 31%, 32%, 33%, 34%, 35%, 36%, 37%, 38%, 39%, 40%, or more, of UV radiation. The UV reflectance can be measured using a UV spectrophotometer, such as a Cary 500 UVNIS/NIR Spectrophotometer equipped with-a DRA-CA-5500 Integrating Sphere, or comparable instrumentation. A thermoplastic composition preferably maintains an initial reflectivity of at least 30% of UV radiation at a wavelength of 254 nm for a suitable period of time, which is preferably at least 10 hours of continuous or intermittent UV radiation, and more preferably up to 20, 30, 40 hours or more of continuous or intermittent UV radiation.

The UV reflective material is selected and configured to provide a thermoplastic composition having desired level of UV reflectivity and a desired level of resistance to UV degradation. The thermoplastic composition is preferably a metal-polymer composite comprising UV reflective metal microparticles dispersed in a thermoplastic polymer resin. The UV reflective material is preferably aluminum, although any suitable UV reflective materials can be used. Suitable UV reflective can include metal or metal alloys, such as stainless steel particles, or non-metal materials such as UV reflective polymer materials. The UV reflective material is preferably configured as particles within the thermoplastic material. The size and density of the particles in the thermoplastic composition can be selected to provide desired levels of UV reflectivity, machine processability, and cost-effectiveness. The particles of UV reflective material can have any size suitable to provide the desired level of UV reflectivity, but are preferably microparticles, such as microparticles having an average size of about 1 to 100 µm, or more preferably about 15 µm to about 55 µm, including particles having an average size of about 15, 17, 20, 25, 30, 35, 40, 45, 50, 54 or 55 µm.

Any density of particles of UV reflective material can be included in a thermoplastic material that provides a thermoplastic composition with a desired level of UV reflectivity. The density of particles of UV reflective materials is preferably high enough to provide a desired level the UV reflectivity to a thermoplastic composition, without undesirably affecting the machine processibility of a thermoplastic composition. For example, concentrations of abrasive UV reflective materials, such as metallic UV reflective metals, of about 5% or more may cause damage to machining surfaces. Therefore, the density of metallic UV reflective materials in the thermoplastic composition is preferably less than about 5%, 4%, 3% or 2%. To provide adequate levels of UV reflectivity, the density of metallic UV reflective material is preferably at least about 0.25%, 0.50%, 0.75%, 1.00%, 1.25%, or 1.50%. Examples of suitable densities of UV reflective materials include about 1.00%, 1.25%, 1.50%, 1.75% and 2.00%.

Various UV reflective compositions having desired levels of UV reflectivity can be formulated using combinations of UV reflective microparticles of different sizes and concentrations. Larger particles and/or higher concentrations of UV reflective material can provide higher levels of UV reflectivity; smaller particles and lower concentrations of UV reflective material can provide lower levels of UV reflectivity. An increase in the surface area to volume ratio of the UV reflective material may account, at least in part, for the increased UV reflectance of the smaller particles. For example, a thermoplastic composition comprising 1.00% aluminum microparticles having an average size of 17 µm in a polypropylene homopolymer thermoplastic material may have a reflectivity of up to about 40%, or higher, of UV radiation at a wavelength of 254 nm (See Example 1). Comparably, a thermoplastic composition comprising 1.50% aluminum microparticles having an average size of 54 µm in a polypropylene homopolymer thermoplastic material may also have a reflectivity of up to about 40%, or higher, of UV radiation at a wavelength of 254 nm (See Example 2). Preferred UV reflective compositions have a UV reflectance at 254 nm of at least about 30%.

The UV reflective material can be combined with the thermoplastic material by any suitable process. For example, a suitable thermoplastic composition can be formulated by a commercial vendor, such as modified versions of polymer-metal composites sold by Poly One (Northbrook, Ill.) under the tradename GRAVITEC. The thermoplastic material can be selected from any thermopastic material having a desired level of resistance to degradation from exposure to UV radiation. Preferably, the thermoplastic material is obtainable at a low cost, is light weight, and suitable for contact with potable water. The thermoplastic material is preferably a polypropylene homopolymer. One particularly preferred suitable thermoplastic material is a polypropylene homopolymer sold under the trade name PRO-FAX PD702 from POLY-ONE (Northbrook, Ill.), as described in more detail in the Examples below.

Figure 4:
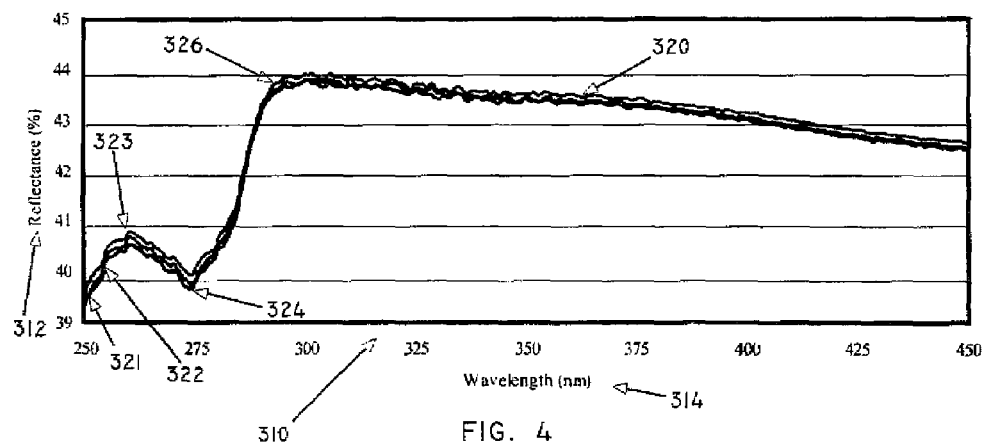
FIG. 4 is a graph showing UV reflectivity of a first exemplary UV-reflective composition.
Figure 5:
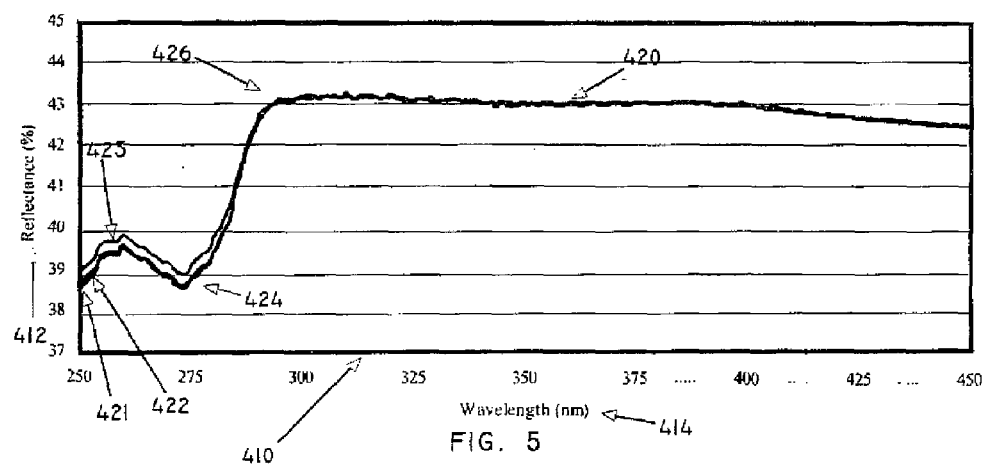
FIG. 5 is a graph showing UV reflectivity of a second exemplary UV-reflective composition.

UV reflective thermoplastic compositions typically reflect UV radiation at various wavelengths. FIG. 4 and FIG. 5 illustrate the UV reflectvity of two UV reflecting compositions as a function of wavelength, as discussed in the Examples below.

The thermoplastic compositions are also preferably suitable for direct contact with water. The thermoplastic compositions may comprise any combination of materials suitable for exposure to water without undergoing an undesirable level of corrosion, and without releasing an undesirable level of impurities. For example, the UV reflective material can be enclosed in a protective material, such as a silicone prior to combination with the thermoplastic material. The protective material can prevent contamination of, or interaction with, a fluid sample. UV reflective materials that form a metal oxide upon contact with a water sample, such as aluminum, are preferably encapsulated in a non-reactive material prior to combination with the thermoplastic material. Any suitable non-reactive material coatings can be used, such as silicone or derivatives thereof. Preferably, contacting a UV reflective thermoplastic composition with water for a period of time to decontaminate the water does not result in the migration of an undesirable level of impurities from the thermoplastic composition to the purified water. For example, when the thermoplastic composition comprises aluminum, contacting water with the thermoplastic composition for a desired period of time results in less than 1.0 ppb of aluminum transferred from the thermoplastic composition to the contacting water.

Fluid Treatment Systems

The UV reflective thermoplastic compositions described herein are useful, for example, in forming articles of manufacture comprising a UV reflective surface that are suitable for use in a fluid treatment system. A fluid treatment system can have any suitable design configuration. Preferably, the fluid treatment system is a water treatment system comprising a UV reflective surface and a UV radiation source configured and positioned so that UV radiation from the UV radiation source passes through a water sample and is reflected from the UV reflective surface back through the water sample. Decontamination of a water sample can be performed by UV radiation of a water sample maintained in contact with a UV reflective surface during decontamination, or in a separate, UV transparent conduit. The water sample can be flowing or stationary during decontamination. Water treatment systems optionally further comprise a filtering means, such as a carbon block, allowing a water sample to be passed through additional purification stages before, during or after UV radiation.

Many exemplary embodiments described below are discussed with respect to a water treatment system that can be used in a variety of end use applications and devices. However, water is used merely to describe an exemplary fluid. Any liquid or gas can be treated using the water treatment systems described herein. For example, the water treatment system can be used as part of a water purification system to provide potable water to an end user. The water treatment systems are also useful, for example, for disinfecting water or other fluids, including any suitable liquid or gas. Other appliances that can employ the water treatment systems disclosed herein include without limitation: ambient temperature and chilled water tanks, refrigerators, water fountains, water towers, beverage makers, beverage dispensers, dishwashers, water heaters, washing machines, swimming pools, showers, toilets and water pumps. Appliances comprising a water treatment system can be provided for point-of-use applications. Additionally, appliances not traditionally associated with food consumption, but that can harbor pathogens, may be fitted with a fluid treatment system, such as air conditioners, storage containers, air purifiers and the like.

In one embodiment, a fluid treatment system is a water treatment system configured to maintain a water sample in simultaneous contact with a UV radiation source and a UV reflective surface. During operation, UV radiation passes from the UV radiation source through the water sample to illuminate the UV reflective surface, and is reflected back into the water sample to promote decontamination. Referring to FIG. 1, an example of a UV lamp assembly 10 portion of a water treatment system includes a housing 12 defining water treatment chamber 20, a water inlet port 26 and a water outlet port 28. A UV radiation source 30 comprising a UV radiation bulb 32 enclosed within a UV transparent casing 34 and a power inlet 36. The UV radiation bulb 32 emits UV radiation 40 in an energized state, for example after being connected through the power inlet 36 to a suitable power source. Preferably, the UV radiation 40 comprises germicidal UV radiation, including light at a wavelength of 254 nm. The UV radiation 40 can be emitted at a constant rate, or can be pulsed, depending on the desired level of irradiation of the water sample, the rate of water flow through the water treatment chamber 20 and other design choices made for a particular application. While the water treatment chamber is configured as a cylindrical water treatment chamber 20, various design criteria may inform the selection any alternative suitable shape or configuration for the water treatment chamber. The UV radiation source 30 is positioned at the center of the cylindrical water treatment chamber 20, permitting unirradiated water 50 entering the water treatment chamber 20 to pass through the cylindrical water treatment chamber 20 and around the UV radiation source 30 before irradiated water 52 exits through the water outlet port 28. The internal surface 22 of the housing 12 is formed from a UV reflective thermoplastic composition 24. The entire housing 12 can be formed from the UV reflective thermoplastic composition 24, a molded interior liner can be formed from the UV reflective thermoplastic composition 24 or the interior surface or a portion of the housing 12 can be coated with a layer of the UV reflective thermoplastic composition 24. Where provided as an interior surface layer or interior liner, the thickness of the UV reflective thermoplastic composition 24 can be selected to provide a desired level of UV reflectivity. Preferably, the UV reflective thermoplastic composition 24 provides at least 30% reflectivity of UV radiation at a wavelength of 254 nm, more preferably at least 31%, 32%, 33%, 34%, 35%, 36%, 37%, 38%, 39%, 40%, or more, UV reflectivity at the 254 nm wavelength. At least a portion of the UV radiation 40 incident upon the UV reflective surface reflects off the UV reflective surface. Reflected UV radiation 42 passes back through the water sample, increasing the intensity of UV radiation within the water sample.

Water treatment systems including a UV-reflective stainless steel sleeve around a UV radiation source can be advantageously modified by replacing the stainless steel sleeve with a UV reflective thermoplastic composition. For example, a water treatment system including a UV-reflective stainless steel sleeve positioned around a UV radiation source is described in U.S. Pat. No. 6,726,839 to Taylor, filed Sep. 4, 2002 and incorporated herein by reference in its entirety. Preferably, the UV reflective thermoplastic compositions are formulated to provide a lighter weight, lower cost alternative to stainless steel as a UV reflective material that can be maintained in contact with a water sample and that provide adequate or even enhanced levels of UV reflectivity. For example, stainless steel is believed to provide about 30% reflectivity for UV radiation at a wavelength of 254 nm, while UV reflective thermoplastic compositions described herein can provide comparable or greater levels of UV radiation reflectivity at the 254 nm wavelength.

Optionally, the water treatment system 10 can be used in combination with a filtering means, such as a porous carbon block or other filtration mechanisms. For example, the unirradiated water 50 or irradiated water 52 can be passed through one or more carbon filters or a molecular sieve material prior to entering through the water inlet port 26 or after leaving through the water outlet port 28. All or a portion of the volume of the water treatment chamber 20 can include filtering means, such as a porous carbon block or molecular sieves. Porous inorganic materials such as zeolites may also be employed as a filtering means. The filtering means can also include inducing turbulent rather than laminar flow within the water treatment chamber 20, such as the introduction of baffles described in U.S. Pat. No. 6,726,839 to Taylor, filed Sep. 4, 2002.

Figure 2:
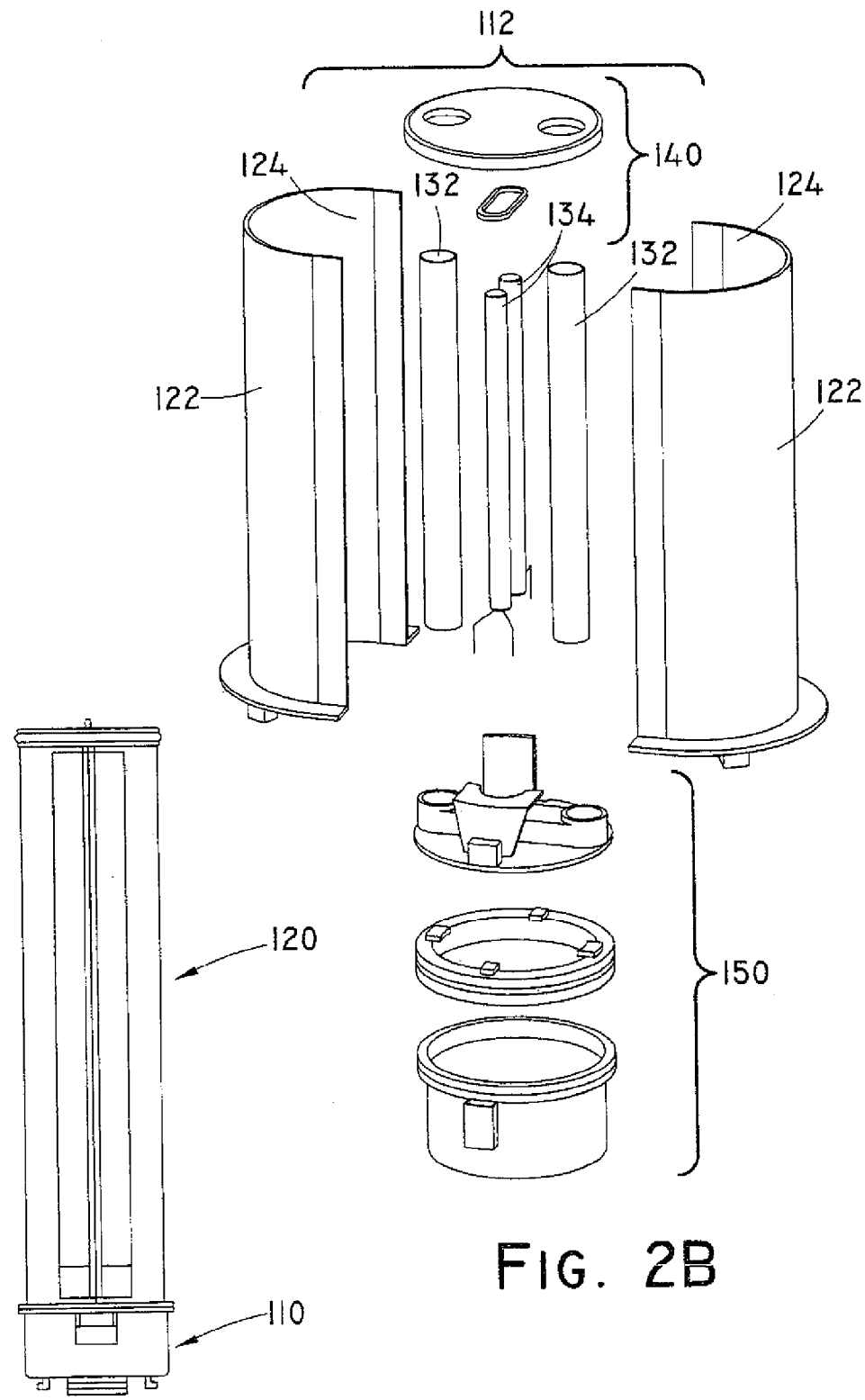
FIGS. 2A-2B are an elevational view, and an exploded perspective view of a second UV lamp assembly.

In another embodiment, a water treatment device is configured to maintain a water sample in a separate UV transparent conduit near a UV radiation source assembly and a UV reflective surface. During operation, UV radiation passes from the UV radiation source through the water sample to illuminate the UV reflective surface, and is reflected back into the water sample, through the UV transparent conduit, to promote decontamination. For example, the water treatment systems described in U.S. Pat. No. 6,659,319 to Kuennen et al., filed Jun. 26, 2002 and incorporated herein by reference in its entirety, include a UV lamp assembly that maintains a water sample in a UV transparent conduit during UV radiation. The UV lamp assembly can be modified to incorporate a UV reflective thermoplastic composition, as shown in FIGS. 2A-B. FIG. 2A show a UV lamp assembly 110 in an assembled configuration 120. FIG. 2B shows a the UV lamp assembly 110 from a water treatment system, in an exploded view 112. Referring to FIG. 2B, water is contained within two UV transparent quartz sleeves 132 positioned proximate to a UV radiation source 134 that emits germicidal UV radiation when in an energized state. Also included are a first end cap assembly 140 and a second end cap assembly 150. Two cooperating enclosure subassemblies 122 are configured and positioned to interlock with the first end cap assembly 140 and the second end cap assembly 150 to enclose the UV radiation source 134 and the UV transparent quartz sleeves 132 containing the water to be irradiated. The internal surface 124 of the each cooperating enclosure subassemblies 132 is formed from a UV reflective thermoplastic composition. The entire cooperating enclosure subassemblies 132 can be formed from the UV reflective thermoplastic composition. Alternatively, a molded interior liner can be formed from the UV reflective thermoplastic composition or the interior surface 124 or a portion of the cooperating enclosure subassemblies 132 can be coated with a layer of the UV reflective thermoplastic composition. At least a portion of the UV radiation incident upon the UV reflective surface reflects off the UV reflective surface. Reflected UV radiation passes back through the UV transparent quartz sleeves 132 containing the water sample, increasing the intensity of UV radiation within the water sample.

Figure 3:
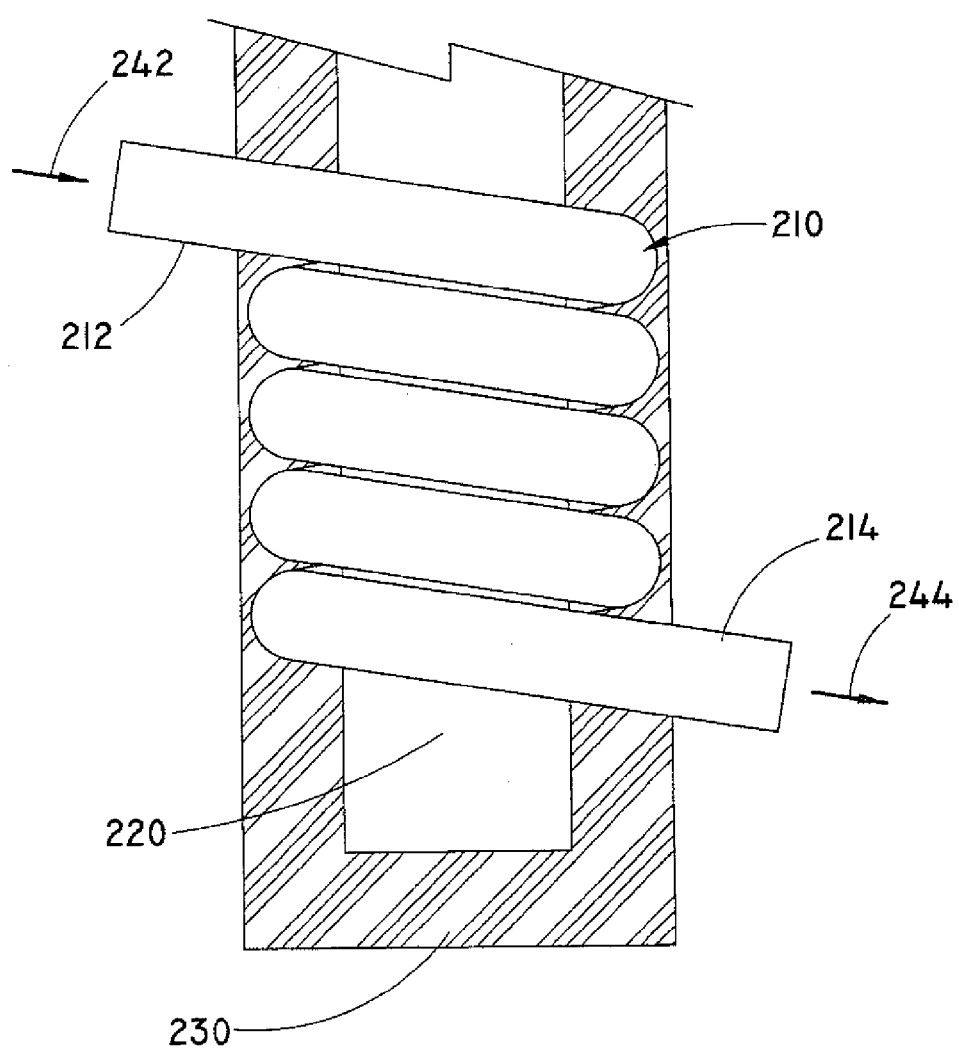
FIG. 3 is a cut-away view of a third UV lamp assembly configuration.

FIG. 3 is a cross section of another fluid treatment device configured to maintain a fluid sample in a separate UV transparent conduit near a UV radiation source assembly and a UV reflective surface. A fluid conduit 210 having sufficient UV transparency is coiled around a UV radiation source 220. At least a portion of the fluid conduit 210 is surrounded by a UV reflective thermoplastic composition 230 that reflects UV radiation passing through the fluid conduit 210. The fluid conduit 210 can be formed from a sufficiently UV transparent material that provides enough UV transparency to allow a desired intensity of UV radiation within the interior of the fluid conduit 210, such as quartz, hard or soft glass, and transparent or translucent plastic (polytetrafluoroethylene, polyvinylfluoride, polycarbonates and the like). For example, the fluid conduit 210 can be formed from a UV transparent polymer. Unirradiated fluid 242 enters the fluid conduit 210 at an inlet port 212, flows through the fluid conduit 210 while being irradiated by the UV radiation source 220, and irradiated fluid 214 exits the fluid conduit 210 via the exit port 244. While the fluid is preferably water, any liquid or gas can be purified.

The UV reflective compositions described herein with reference to water treatment systems to illustrative certain embodiments of the invention. However, the UV reflective compositions can also be useful in forming a variety of UV-reflective end-use applications, including portions of water treatment systems, storage containers, medical devices, food packages, plastic tubes and pipes, shelving units, and the like.

In another embodiment, methods of treating fluids, such as water, are provided. The methods comprise the step of irradiating a fluid with a UV radiation reflected from a UV reflective surface comprising a thermoplastic material and a UV reflective material. Preferably, the methods of purifying fluid further provide for simultaneously, or separately, irradiating a fluid sample with ultraviolet radiation reflected from an ultraviolet reflective surface formed at least in part from a UV reflective thermoplastic composition, such as a polypropylene thermoplastic material containing from about 0.5% to about 5% UV reflective microparticles having an average size of between about 15 µm and about 55 µm. The ultraviolet reflecting surface is preferably provides a reflectivity of at least 30% of ultraviolet light having a wavelength of 254 nm for a period of continuous ultraviolet light exposure of at least 40 hours. Also preferably, less than 1.0 ppb of aluminum is detected in a water sample after contacting the water sample with the ultraviolet reflective surface for at least 40 hours. The ultraviolet reflecting surface is preferably provides a reflectivity of at least 30% of the ultraviolet light at a wavelength of 254 nm.

A method of purifying water can comprise the step of: contacting water with an ultraviolet reflective surface formed at least in part from a UV reflective thermoplastic composition, such as a polypropylene containing from about 1% to about 5% aluminum microparticles having an average size of between about 15 µm and about 55 µm. The ultraviolet reflecting surface is preferably characterized by a reflectivity of at least 30% of ultraviolet light having a wavelength of 254 nm. The UV reflective thermoplastic composition is preferably suitable for water contact. For example, less than 1.0 ppb of aluminum is preferably detected in a water sample after contacting the water sample with the ultraviolet reflective surface for at least 40 hours. The ultraviolet reflecting surface is also preferably characterized by a reflectivity of at least 30% of the ultraviolet light at a wavelength of 254 nm for a suitable period of continuous ultraviolet light exposure, such as at least 40 hours.

UV Radiation Source

Any suitable UV radiation source can be used in water treatment systems, and can be selected given various design considerations including: the wavelength and intensity of UV light required to decontaminate a water sample, the resistance of the UV reflective thermoplastic composition to degredation from UV radiation, the volume and flow rate of the water sample, and the contaminants in the water sample. Water treatment systems comprise a UV radiation source selected, configured and positioned to provide a dose of UV radiation that is adequate to reduce the incidence of undesirable pathogens within a water sample.

Preferably, a UV radiation source emits UV radiation at a wavelength that beneficially kills biological contaminants within a water sample. For example, UV radiation preferably comprises radiation at a wavelength that is absorbed by DNA. Preferably, the UV radiation source can be a low pressure mercury vapor arc lamp with a peak output of low pressure mercury arc lamps at 254 nm, such as Philips Model TUV PL-S 38W4P lamp. However, any suitable UV lamps can be used as a radiation source, including low pressure, medium pressure, high pressure and ultra high-pressure lamps, which are made of various materials, most commonly comprising mercury (Hg). Spectral calibration lamps, electrodeless lamps and the like can also be used. If desired, a pencil-type spectral calibration UV lamp can be used to provide a narrow, intense UV emission that is substantially constant and reproducible. Hg(Ar) lamps of this type are generally insensitive to temperature and require a short (e.g., two minute) warm-up for the mercury vapor to dominate the discharge, then about 30 minutes for complete stabilization. Another example of a commercially available Hg(Ar) UV lamp is provided by ORIEL Instruments, model 6035, which emits UV radiation at 254 nm. When operated at 15 mA using a DC power supply, the lamp is indicated to emit 74 microwatts/cm$^2$ of 254 nm UV radiation at 25 cm from the source. Medium to high pressure UV lamps can also be used as UV radiation sources. Another example of a suitable UV radiation source is a Fusion RF UV lamp, commercially available from Fusion UV Systems, Inc., which emits UV B and UV C radiation at about 200W/cm. Still other UV radiation sources include germicidal UV lamps sold by North American Philips Lightins as Model No. 782L-30 and Model No. G37TVH.

UV dose is measured as the product of UV light intensity times the exposure time within the UV lamp array. The effective dose of UV energy is believed to be approximately 34,000 microwatt-seconds/cm$^2$ needed to destroy pathogens as well as indicator organisms found in wastewater. UV radiation dose (also referred to as fluence) is determined by variables associated with the design and operation of the water treatment system, the type of UV radiation source selected, as well as the characteristics of the water that is treated. Fluence is calculated as the product of light intensity at a given wavelength and exposure time.

The UV radiation intensity at any given point in a water sample can be determined by UV radiation source strength and the geometry of the portion of the water treatment system containing the water sample. UV radiation fluence depends on UV radiation source strength. A 30 Watt low pressure GE T8 UV radiation source bulb emits approximately 5 Watts at 254 nm. As the bulb ages its strength will slowly diminish. GE recommends a replacement after 7,500 hours, assuming bulb is turned on for 3 hour periods. Each start is expected to decrease the bulbs lifetime, so if the bulb is left on for periods greater than 3 hours, it may last longer.

Conversely, if a bulb is turned on and off for periods shorter than 3 hours, its lifetime may be reduced to fewer than 7,500 hours.

UV intensity within a fluid sample can decrease due to attenuation and dissipation. Water positioned farther from the UV radiation source is subjected to a lower UV radiation intensity, as a result of dissipation of the UV radiation passing through a larger volume of water as the distance from the UV radiation source increases, and as a result of interaction of the UV radiation with molecules in the water (attenuation). While dissipation can be predicted simply by the geometry of the water treatment system, attenuation depends on characteristics of the water. If the water contains a high concentration of materials that absorb UV light, then less UV will be transmitted. The exposure time is governed by the geometry and the hydrodynamics of the water treatment system. The water treatment system is preferably configured such that the lowest fluence received by any of the water is sufficient to achieve the desired reduction in microorganisms. Fluence may be reported in mW-sec/cm$^2$, which is equivalent to mJ/cm$^2$, or in the SI units, J/m$^2$. Standard doses delivered by a UV drinking water treatment system are between 15 and 50 mW-sec/cm$^2$. Various units used in UV disinfection and their relation to some equivalent units are as follows: energy is measured in Joules (J); power is measured in Wafts (W), which is equivalent to 1 J/s; Intensity is measured in W/cm$^2$, which is equivalent to $10^3$ mW/cm$^2$; and fluence is measured in mWs/cm$^2$, which is equivalent to 1 mJ/cm$^2$, $10^3$ Ws/cm$^2$ or 10 J/m$^2$.

An absorption coefficient (a) describes how much light is absorbed percentimeter as it travels through a water treatment sample. As the absorption coefficient increases, transmissivity decreases exponentially, therefore the absorption coefficient of the water plays a very important role in the effectiveness of the UV disinfection device. The absorption coefficient can be determined experimentally and is reported in inverse centimeters. The absorption coefficient of pure distilled water is close to zero. Natural organic matter, iron, nitrate and manganese absorb UVC light and are expected to increase the absorption coefficient of a water sample. Absorption coefficients in drinking water would be expected in the range of 0.01 to 0.2 cm$^{-1}$.

UV radiation sources can be included in UV lamp subassemblies configured to form a portion of a water treatment systems. UV lamp subassemblies preferably include a UV transparent casing enclosing the UV radiation source. The UV transparent casing is preferably formed from a UV-transparent material that is suitable for contact with a water sample to be decontaminated, such as a quartz, hard or soft glass, and transparent or translucent plastic (polytetrafluoroethylene, polyvinylfluoride, polycarbonates and the like). Examples of suitable UV lamp subassembly configurations are found in U.S. Pat. Nos. 6,726,839 and 6,569,319, which are incorporated by reference herein. For example, U.S. Pat. No. 6,569,319 discloses a suitable example of UV bulb assembly comprising two side-by-side emitting bulbs with a passageway which allows gases to pass between the two bulbs. A pair of filaments can be electrically connected to respective pairs of leads. Leads can pass through a base of UV bulb assembly and can be connected to secondary coil to power the lamp assembly. Operation of the UV bulb assembly is also described in U.S. Pat. No. 6,569,319.

The water treatment sample can be stationary or flowing during UV radiation. Typically, a higher the flow rate results in a smaller UV radiation dose received by the water. An appropriate flow rate must be determined based on the other characteristics of the water and on the desired dose. Since attenuation is proportional to the absorption coefficient, the optimal water volume exposed to UV radiation will depend on the absorption coefficient.

Optionally, the UV radiation source can be arranged, configured and programmed to run intermittently, such as for an hour per day, so as to extend the operational life of a UV lamp radiation source.

Fluid Filtration

The water treatment systems optionally comprise one or more filtration means to remove particulate or chemical impurities from an effluent stream before, during or after UV radiation. The filtration means can include a carbon filter, a molecular sieve material, or one or more flow modifying surfaces to modify fluid flow within the water treatment system to beneficially remove particulate contaminants from the water. The filtration means can be adapted to remove organic materials such as benzene, and is preferably formed of activated carbon or an absorbing polymer resin. To remove inorganic materials, such as heavy metal or sulfites, a filtration means can comprise an ion exchange resin, zeolite or a reduction catalyst. Preferably, a filtration means removes UV absorbing contaminants from the water sample prior to UV radiation of the water sample. Turbidity is a measure of the quantity of particulates in a solution, and can be determined by shining an infrared beam of light through a one centimeter thick sample and measuring light detected by sensors placed at ninety degrees to the beam. Turbidity is not necessarily correlated with the absorption coefficient. Turbidity is commonly reported in NTU.

EXAMPLES

The following examples are included to demonstrate preferred embodiments of the invention. It should be appreciated by those of skill in the art that the materials and techniques disclosed in the examples which follow represent materials techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

UV Reflectance of a 1% Al Flake Polypropylene Thermoplastic Composition

A first thermoplastic composition was formed from a 1.5% aluminum microparticles having an average size of 54 µm, in a polypropylene thermoplastic material homopolymer sold under the tradename PRO-FAX PD702 from POLY ONE (Northbrook, Ill.). The PRO-FAX PD 702 polypropylene complies with FDA requirements under 21 C.F.R. 177/1520 for food contact applications up to 212° F., and USP Class VI testing, as well as chemical registration requirements of TSCA (US) and DSL (Canada).

The PRO-FAX PD 702 thermoplastic polypropylene homopolymer resin was purchased from a commercial vendor, POLY ONE (Northbrook, Ill.) and is indicated as having the following physical properties: a density of 0.902 sp gr 23/23° C. (ASTM D792, Method B), a Melt Mass-Flow Rate (MFR, 230° C./2.16 kg) of 35.0 g/10 min (ASTM D1238), a tensile strength at yield of 4600 psi (ASTM D638), a tensile elongation at yield of 12% (ASTM D638), a flexural modulus (Procedure A, measured at 0.05 in/min) of 1% Secant: 170000 psi (ASTM D790), a notched Izod impact (73° C.) of 0.600 ft-lb/in (ASTM D256), a Rockwell hardness (R-scale) of 89 (ASTM D785), and a DTUL at 66 psi (unannealed) of 203° F. (ASTM D648).

The UV reflectance of three samples was measured from a wavelength of 250 nm to 450 nm, and the data is included in Table 1 below. Data in the column "1% Al-1" was obtained from first sample, data in the column "1% Al-2" was obtained from second sample, and in the column "1% Al-3" was obtained from third sample. All three samples were identical.

TABLE 1

| Wavelength (nm) | 1% Al-1 | 1% Al-2 | 1% Al-3 |
| --- | --- | --- | --- |
| 250 | 38.8 | 38.3 | 38.4 |
| 251 | 38.9 | 38.5 | 38.6 |
| 252 | 39.1 | 38.7 | 38.8 |
| 253 | 39.2 | 38.8 | 38.9 |
| 254 | 39.3 | 38.9 | 39.0 |
| 255 | 39.5 | 39.2 | 39.3 |
| 256 | 39.6 | 39.2 | 39.3 |
| 257 | 39.7 | 39.3 | 39.4 |
| 258 | 39.6 | 39.3 | 39.4 |
| 259 | 39.6 | 39.3 | 39.4 |
| 260 | 39.8 | 39.5 | 39.5 |
| 261 | 39.8 | 39.4 | 39.5 |
| 262 | 39.7 | 39.4 | 39.4 |
| 263 | 39.6 | 39.3 | 39.3 |
| 264 | 39.5 | 39.2 | 39.2 |
| 265 | 39.5 | 39.2 | 39.2 |
| 266 | 39.4 | 39.1 | 39.1 |
| 267 | 39.3 | 39.0 | 39.0 |
| 268 | 39.2 | 38.9 | 38.9 |
| 269 | 39.1 | 38.8 | 38.8 |
| 270 | 39.1 | 38.8 | 38.9 |
| 271 | 39.0 | 38.7 | 38.8 |
| 272 | 38.9 | 38.6 | 38.7 |
| 273 | 38.9 | 38.5 | 38.6 |
| 274 | 38.8 | 38.5 | 38.6 |
| 275 | 39.0 | 38.7 | 38.7 |
| 276 | 39.2 | 38.8 | 38.8 |
| 277 | 39.2 | 38.8 | 39.0 |
| 278 | 39.4 | 39.0 | 39.0 |
| 279 | 39.4 | 39.0 | 39.1 |
| 280 | 39.6 | 39.3 | 39.3 |
| 281 | 39.8 | 39.4 | 39.5 |
| 282 | 40.0 | 39.6 | 39.7 |
| 283 | 40.2 | 39.9 | 39.9 |
| 284 | 40.6 | 40.2 | 40.2 |
| 285 | 41.0 | 40.7 | 40.8 |
| 286 | 41.4 | 41.1 | 41.2 |
| 287 | 41.7 | 41.5 | 41.6 |
| 288 | 42.0 | 41.9 | 41.9 |
| 289 | 42.4 | 42.2 | 42.2 |
| 290 | 42.6 | 42.5 | 42.5 |
| 291 | 42.8 | 42.7 | 42.6 |
| 292 | 42.9 | 42.9 | 42.8 |
| 293 | 43.0 | 42.9 | 42.9 |
| 294 | 43.0 | 43.0 | 43.0 |
| 295 | 43.1 | 43.1 | 43.1 |
| 296 | 43.0 | 43.1 | 43.0 |
| 297 | 43.1 | 43.1 | 43.1 |
| 298 | 43.1 | 43.1 | 43.0 |
| 299 | 43.1 | 43.1 | 43.1 |
| 300 | 43.2 | 43.2 | 43.2 |
| 301 | 43.2 | 43.2 | 43.1 |
| 302 | 43.2 | 43.2 | 43.1 |
| 303 | 43.2 | 43.2 | 43.2 |
| 304 | 43.2 | 43.1 | 43.1 |
| 305 | 43.2 | 43.2 | 43.2 |
| 306 | 43.2 | 43.2 | 43.2 |
| 307 | 43.2 | 43.2 | 43.1 |
| 308 | 43.2 | 43.2 | 43.2 |

TABLE 1-continued

| Wavelength (nm) | 1% Al-1 | 1% Al-2 | 1% Al-3 |
| --- | --- | --- | --- |
| 309 | 43.2 | 43.2 | 43.1 |
| 310 | 43.3 | 43.3 | 43.2 |
| 311 | 43.2 | 43.2 | 43.2 |
| 312 | 43.1 | 43.1 | 43.1 |
| 313 | 43.2 | 43.2 | 43.2 |
| 314 | 43.2 | 43.1 | 43.2 |
| 315 | 43.2 | 43.2 | 43.1 |
| 316 | 43.2 | 43.2 | 43.2 |
| 317 | 43.2 | 43.2 | 43.2 |
| 318 | 43.2 | 43.1 | 43.1 |
| 319 | 43.2 | 43.2 | 43.1 |
| 320 | 43.2 | 43.2 | 43.2 |
| 321 | 43.2 | 43.2 | 43.2 |
| 322 | 43.1 | 43.2 | 43.1 |
| 323 | 43.2 | 43.1 | 43.1 |
| 324 | 43.0 | 43.0 | 43.1 |
| 325 | 43.1 | 43.1 | 43.1 |
| 326 | 43.2 | 43.1 | 43.1 |
| 327 | 43.1 | 43.2 | 43.1 |
| 328 | 43.1 | 43.1 | 43.1 |
| 329 | 43.2 | 43.2 | 43.1 |
| 330 | 43.1 | 43.1 | 43.0 |
| 331 | 43.1 | 43.1 | 43.1 |
| 332 | 43.1 | 43.1 | 43.1 |
| 333 | 43.1 | 43.1 | 43.1 |
| 334 | 43.1 | 43.1 | 43.1 |
| 335 | 43.1 | 43.2 | 43.1 |
| 336 | 43.1 | 43.1 | 43.1 |
| 337 | 43.1 | 43.1 | 43.1 |
| 338 | 43.1 | 43.1 | 43.1 |
| 339 | 43.1 | 43.1 | 43.1 |
| 340 | 43.1 | 43.1 | 43.0 |
| 341 | 43.0 | 43.0 | 43.0 |
| 342 | 43.0 | 43.1 | 43.0 |
| 343 | 43.1 | 43.1 | 43.1 |
| 344 | 42.9 | 43.0 | 43.0 |
| 345 | 43.1 | 43.1 | 43.1 |
| 346 | 43.0 | 43.1 | 43.1 |
| 347 | 43.0 | 43.1 | 43.1 |
| 348 | 43.0 | 43.0 | 43.0 |
| 349 | 43.0 | 43.0 | 43.0 |
| 350 | 43.0 | 43.1 | 43.1 |
| 351 | 43.0 | 43.0 | 43.1 |
| 352 | 43.0 | 43.1 | 43.0 |
| 353 | 43.0 | 43.0 | 43.0 |
| 354 | 43.0 | 43.0 | 43.0 |
| 355 | 43.0 | 43.1 | 43.1 |
| 356 | 43.0 | 43.1 | 43.0 |
| 357 | 43.0 | 43.0 | 43.0 |
| 358 | 43.0 | 43.1 | 43.0 |
| 359 | 43.0 | 43.1 | 43.0 |
| 360 | 43.0 | 43.0 | 43.0 |
| 361 | 43.0 | 43.1 | 43.0 |
| 362 | 43.0 | 43.1 | 43.0 |
| 363 | 43.0 | 43.1 | 43.0 |
| 364 | 43.0 | 43.1 | 43.0 |
| 365 | 43.0 | 43.1 | 43.1 |
| 366 | 43.1 | 43.1 | 43.1 |
| 367 | 43.1 | 43.1 | 43.0 |
| 368 | 43.0 | 43.1 | 43.1 |
| 369 | 43.1 | 43.1 | 43.0 |
| 370 | 43.0 | 43.1 | 43.1 |
| 371 | 43.1 | 43.1 | 43.1 |
| 372 | 43.0 | 43.1 | 43.0 |
| 373 | 43.0 | 43.1 | 43.0 |
| 374 | 43.0 | 43.1 | 43.0 |
| 375 | 43.1 | 43.1 | 43.1 |
| 376 | 43.0 | 43.1 | 43.1 |
| 377 | 43.1 | 43.1 | 43.1 |
| 378 | 43.0 | 43.1 | 43.1 |
| 379 | 43.0 | 43.1 | 43.0 |
| 380 | 43.1 | 43.1 | 43.1 |
| 381 | 43.1 | 43.1 | 43.1 |
| 382 | 43.1 | 43.1 | 43.1 |
| 383 | 43.1 | 43.1 | 43.1 |
| 384 | 43.1 | 43.1 | 43.1 |

TABLE 1-continued

| Wavelength (nm) | 1% Al-1 | 1% Al-2 | 1% Al-3 |
|---|---|---|---|
| 385 | 43.1 | 43.1 | 43.1 |
| 386 | 43.1 | 43.1 | 43.1 |
| 387 | 43.1 | 43.1 | 43.1 |
| 388 | 43.1 | 43.1 | 43.1 |
| 389 | 43.1 | 43.1 | 43.1 |
| 390 | 43.1 | 43.1 | 43.1 |
| 391 | 43.1 | 43.1 | 43.1 |
| 392 | 43.1 | 43.1 | 43.1 |
| 393 | 43.1 | 43.0 | 43.0 |
| 394 | 43.1 | 43.0 | 43.0 |
| 395 | 43.1 | 43.0 | 43.0 |
| 396 | 43.1 | 43.0 | 43.0 |
| 397 | 43.1 | 43.0 | 43.0 |
| 398 | 43.1 | 43.0 | 43.0 |
| 399 | 43.1 | 43.0 | 43.0 |
| 400 | 43.1 | 43.0 | 43.0 |
| 401 | 43.0 | 43.0 | 43.0 |
| 402 | 43.0 | 43.0 | 43.0 |
| 403 | 43.0 | 43.0 | 43.0 |
| 404 | 43.0 | 43.0 | 43.0 |
| 405 | 43.0 | 43.0 | 42.9 |
| 406 | 43.0 | 43.0 | 43.0 |
| 407 | 43.0 | 42.9 | 42.9 |
| 408 | 43.0 | 42.9 | 42.9 |
| 409 | 42.9 | 42.9 | 42.9 |
| 410 | 42.9 | 42.9 | 42.9 |
| 411 | 42.9 | 42.9 | 42.9 |
| 412 | 42.9 | 42.9 | 42.9 |
| 413 | 42.9 | 42.9 | 42.9 |
| 414 | 42.9 | 42.8 | 42.8 |
| 415 | 42.9 | 42.8 | 42.8 |
| 416 | 42.9 | 42.8 | 42.8 |
| 417 | 42.8 | 42.8 | 42.8 |
| 418 | 42.8 | 42.8 | 42.8 |
| 419 | 42.8 | 42.8 | 42.8 |
| 420 | 42.8 | 42.8 | 42.8 |
| 421 | 42.8 | 42.8 | 42.8 |
| 422 | 42.8 | 42.7 | 42.7 |
| 423 | 42.8 | 42.7 | 42.8 |
| 424 | 42.8 | 42.7 | 42.7 |
| 425 | 42.8 | 42.7 | 42.7 |
| 426 | 42.8 | 42.7 | 42.7 |
| 427 | 42.7 | 42.7 | 42.7 |
| 428 | 42.7 | 42.7 | 42.7 |
| 429 | 42.7 | 42.7 | 42.7 |
| 430 | 42.7 | 42.7 | 42.7 |
| 431 | 42.7 | 42.7 | 42.7 |
| 432 | 42.7 | 42.6 | 42.7 |
| 433 | 42.7 | 42.7 | 42.7 |
| 434 | 42.7 | 42.6 | 42.7 |
| 435 | 42.7 | 42.6 | 42.7 |
| 436 | 42.7 | 42.6 | 42.6 |
| 437 | 42.7 | 42.6 | 42.6 |
| 438 | 42.7 | 42.6 | 42.6 |
| 439 | 42.7 | 42.6 | 42.6 |
| 440 | 42.6 | 42.6 | 42.6 |
| 441 | 42.6 | 42.6 | 42.6 |
| 442 | 42.6 | 42.6 | 42.6 |
| 443 | 42.6 | 42.6 | 42.6 |
| 444 | 42.6 | 42.6 | 42.6 |
| 445 | 42.6 | 42.6 | 42.6 |
| 446 | 42.6 | 42.6 | 42.6 |
| 447 | 42.6 | 42.6 | 42.6 |
| 448 | 42.6 | 42.5 | 42.6 |
| 449 | 42.6 | 42.5 | 42.5 |
| 450 | 42.6 | 42.5 | 42.5 |

The data from Table 1 is shown in a graph in FIG. 4. Referring to FIG. 4, measurement of the average UV reflectivity 320 of a first thermoplastic composition provided the graph 310 showing percentage UV reflectance 312 as a function of wavelength in nm 314. The first thermoplastic composition was formed with a density of 1.5% aluminum microparticles having an average size of about 54 µm, in a polypropylene thermoplastic material homopolymer sold under the tradename PRO-FAX PD702 from POLY ONE (Northbrook, Ill.). The data for the average UV reflectivity 320 was obtained by averaging data from three samples, as provided in detail in Example 1 below. The UV reflectance 312 of three samples was measured from a wavelength of 250 nm to 450 nm. The UV reflectvity 230 at 254 nm 322 was about 40.0%. The average UV reflectivity 320 at points labeled in FIG. 4 was approximately: 39.5% at 250 nm 321, 40.8% at 260 nm at a first inflection point 323, 39.8% at 274 nm at a second inflection point 324, and 43.8% at 301 nm at a third inflection point 323. Accordingly, the first UV reflective thermoplastic composition provides UV reflectivity of at least 39% in the germicidal UV radiation range.

Example 2

UV Reflectance of a 1.5% Al Flake Polypropylene Thermoplastic Composition

A second thermoplastic composition was formed from a 1.0% aluminum microparticles having an average size of 17 µm, in a polypropylene thermoplastic material homopolymer sold under the tradename PRO-FAX PD702 from POLY ONE (Northbrook, Ill.), as described in Example 1.

The UV reflectance of three samples was measured from a wavelength of 250 nm to 450 nm, and the data is included in Table 2 below. Data in the column "1.5% Al" was obtained from first sample, data in the column "1.5% Al-2" was obtained from second sample, and in the column "1.5% Al-3" was obtained from third sample. All three samples were identical.

TABLE 2

| Wavelength (nm) | 1.5% Al-1 | 1.5% Al-2 | 1.5% Al-3 |
|---|---|---|---|
| 250 | 39.6 | 39.3 | 39.3 |
| 251 | 39.8 | 39.6 | 39.5 |
| 252 | 39.9 | 39.7 | 39.7 |
| 253 | 40.1 | 39.9 | 39.8 |
| 254 | 40.2 | 40.0 | 39.9 |
| 255 | 40.4 | 40.3 | 40.2 |
| 256 | 40.6 | 40.4 | 40.3 |
| 257 | 40.6 | 40.4 | 40.3 |
| 258 | 40.6 | 40.5 | 40.4 |
| 259 | 40.6 | 40.5 | 40.4 |
| 260 | 40.8 | 40.6 | 40.5 |
| 261 | 40.7 | 40.6 | 40.5 |
| 262 | 40.7 | 40.5 | 40.4 |
| 263 | 40.6 | 40.5 | 40.4 |
| 264 | 40.5 | 40.4 | 40.3 |
| 265 | 40.5 | 40.4 | 40.3 |
| 266 | 40.4 | 40.3 | 40.2 |
| 267 | 40.4 | 40.3 | 40.2 |
| 268 | 40.3 | 40.2 | 40.0 |
| 269 | 40.2 | 40.1 | 39.9 |
| 270 | 40.3 | 40.1 | 40.0 |
| 271 | 40.2 | 40.0 | 39.9 |
| 272 | 40.1 | 39.9 | 39.8 |
| 273 | 40.0 | 39.8 | 39.7 |
| 274 | 39.9 | 39.7 | 39.7 |
| 275 | 40.1 | 39.9 | 39.8 |
| 276 | 40.2 | 40.0 | 39.9 |
| 277 | 40.3 | 40.1 | 40.0 |
| 278 | 40.4 | 40.3 | 40.1 |
| 279 | 40.4 | 40.3 | 40.2 |
| 280 | 40.7 | 40.5 | 40.4 |
| 281 | 40.8 | 40.6 | 40.5 |
| 282 | 40.9 | 40.7 | 40.6 |
| 283 | 41.1 | 40.9 | 40.8 |
| 284 | 41.3 | 41.2 | 41.0 |
| 285 | 41.7 | 41.6 | 41.5 |

TABLE 2-continued

| Wavelength (nm) | 1.5% Al-1 | 1.5% Al-2 | 1.5% Al-3 |
|---|---|---|---|
| 286 | 42.0 | 41.9 | 41.8 |
| 287 | 42.4 | 42.3 | 42.2 |
| 288 | 42.7 | 42.7 | 42.6 |
| 289 | 43.0 | 43.0 | 42.9 |
| 290 | 43.3 | 43.3 | 43.2 |
| 291 | 43.4 | 43.4 | 43.3 |
| 292 | 43.5 | 43.6 | 43.4 |
| 293 | 43.6 | 43.7 | 43.5 |
| 294 | 43.6 | 43.7 | 43.6 |
| 295 | 43.7 | 43.8 | 43.7 |
| 296 | 43.7 | 43.8 | 43.6 |
| 297 | 43.7 | 43.8 | 43.6 |
| 298 | 43.7 | 43.8 | 43.7 |
| 299 | 43.7 | 43.8 | 43.7 |
| 300 | 43.7 | 43.9 | 43.8 |
| 301 | 43.8 | 43.8 | 43.8 |
| 302 | 43.8 | 43.9 | 43.7 |
| 303 | 43.7 | 43.8 | 43.7 |
| 304 | 43.7 | 43.8 | 43.6 |
| 305 | 43.8 | 43.8 | 43.7 |
| 306 | 43.8 | 43.9 | 43.7 |
| 307 | 43.7 | 43.8 | 43.6 |
| 308 | 43.7 | 43.8 | 43.6 |
| 309 | 43.6 | 43.8 | 43.6 |
| 310 | 43.8 | 43.8 | 43.7 |
| 311 | 43.8 | 43.9 | 43.7 |
| 312 | 43.7 | 43.8 | 43.6 |
| 313 | 43.7 | 43.8 | 43.6 |
| 314 | 43.7 | 43.7 | 43.6 |
| 315 | 43.6 | 43.8 | 43.6 |
| 316 | 43.7 | 43.8 | 43.6 |
| 317 | 43.6 | 43.7 | 43.7 |
| 318 | 43.7 | 43.7 | 43.6 |
| 319 | 43.7 | 43.8 | 43.6 |
| 320 | 43.7 | 43.8 | 43.6 |
| 321 | 43.7 | 43.7 | 43.5 |
| 322 | 43.6 | 43.7 | 43.5 |
| 323 | 43.6 | 43.7 | 43.5 |
| 324 | 43.6 | 43.6 | 43.5 |
| 325 | 43.6 | 43.7 | 43.6 |
| 326 | 43.6 | 43.7 | 43.5 |
| 327 | 43.6 | 43.7 | 43.5 |
| 328 | 43.5 | 43.6 | 43.5 |
| 329 | 43.6 | 43.7 | 43.5 |
| 330 | 43.5 | 43.6 | 43.4 |
| 331 | 43.5 | 43.6 | 43.4 |
| 332 | 43.6 | 43.6 | 43.5 |
| 333 | 43.5 | 43.5 | 43.4 |
| 334 | 43.5 | 43.6 | 43.5 |
| 335 | 43.5 | 43.6 | 43.5 |
| 336 | 43.5 | 43.5 | 43.4 |
| 337 | 43.4 | 43.5 | 43.3 |
| 338 | 43.5 | 43.6 | 43.4 |
| 339 | 43.4 | 43.6 | 43.5 |
| 340 | 43.4 | 43.5 | 43.4 |
| 341 | 43.5 | 43.6 | 43.4 |
| 342 | 43.4 | 43.5 | 43.4 |
| 343 | 43.4 | 43.5 | 43.3 |
| 344 | 43.4 | 43.5 | 43.3 |
| 345 | 43.5 | 43.5 | 43.4 |
| 346 | 43.4 | 43.5 | 43.4 |
| 347 | 43.4 | 43.5 | 43.3 |
| 348 | 43.3 | 43.5 | 43.3 |
| 349 | 43.4 | 43.5 | 43.3 |
| 350 | 43.4 | 43.5 | 43.4 |
| 351 | 43.4 | 43.5 | 43.4 |
| 352 | 43.4 | 43.5 | 43.4 |
| 353 | 43.3 | 43.4 | 43.3 |
| 354 | 43.4 | 43.5 | 43.3 |
| 355 | 43.4 | 43.5 | 43.4 |
| 356 | 43.4 | 43.5 | 43.3 |
| 357 | 43.4 | 43.5 | 43.3 |
| 358 | 43.4 | 43.5 | 43.3 |
| 359 | 43.3 | 43.5 | 43.3 |
| 360 | 43.4 | 43.5 | 43.3 |
| 361 | 43.4 | 43.5 | 43.3 |
| 362 | 43.3 | 43.5 | 43.3 |
| 363 | 43.3 | 43.4 | 43.3 |
| 364 | 43.4 | 43.4 | 43.3 |
| 365 | 43.4 | 43.4 | 43.3 |
| 366 | 43.3 | 43.4 | 43.3 |
| 367 | 43.4 | 43.4 | 43.3 |
| 368 | 43.3 | 43.4 | 43.3 |
| 369 | 43.3 | 43.4 | 43.3 |
| 370 | 43.3 | 43.4 | 43.3 |
| 371 | 43.3 | 43.4 | 43.3 |
| 372 | 43.3 | 43.4 | 43.3 |
| 373 | 43.3 | 43.4 | 43.2 |
| 374 | 43.3 | 43.4 | 43.2 |
| 375 | 43.3 | 43.4 | 43.2 |
| 376 | 43.3 | 43.4 | 43.2 |
| 377 | 43.3 | 43.4 | 43.2 |
| 378 | 43.3 | 43.3 | 43.2 |
| 379 | 43.2 | 43.3 | 43.2 |
| 380 | 43.3 | 43.3 | 43.2 |
| 381 | 43.2 | 43.3 | 43.2 |
| 382 | 43.2 | 43.3 | 43.2 |
| 383 | 43.2 | 43.3 | 43.2 |
| 384 | 43.2 | 43.3 | 43.1 |
| 385 | 43.2 | 43.3 | 43.2 |
| 386 | 43.2 | 43.3 | 43.1 |
| 387 | 43.2 | 43.3 | 43.1 |
| 388 | 43.1 | 43.3 | 43.1 |
| 389 | 43.1 | 43.2 | 43.1 |
| 390 | 43.1 | 43.2 | 43.1 |
| 391 | 43.1 | 43.2 | 43.1 |
| 392 | 43.1 | 43.2 | 43.1 |
| 393 | 43.1 | 43.2 | 43.0 |
| 394 | 43.1 | 43.2 | 43.0 |
| 395 | 43.1 | 43.2 | 43.0 |
| 396 | 43.1 | 43.2 | 43.0 |
| 397 | 43.0 | 43.2 | 43.0 |
| 398 | 43.0 | 43.1 | 43.0 |
| 399 | 43.0 | 43.1 | 43.0 |
| 400 | 43.0 | 43.1 | 43.0 |
| 401 | 43.0 | 43.1 | 43.0 |
| 402 | 43.0 | 43.1 | 42.9 |
| 403 | 43.0 | 43.1 | 42.9 |
| 404 | 43.0 | 43.1 | 42.9 |
| 405 | 42.9 | 43.0 | 42.9 |
| 406 | 42.9 | 43.0 | 42.9 |
| 407 | 42.9 | 43.0 | 42.9 |
| 408 | 42.9 | 43.0 | 42.9 |
| 409 | 42.9 | 43.0 | 42.8 |
| 410 | 42.9 | 43.0 | 42.8 |
| 411 | 42.9 | 43.0 | 42.8 |
| 412 | 42.8 | 42.9 | 42.8 |
| 413 | 42.8 | 42.9 | 42.8 |
| 414 | 42.8 | 42.9 | 42.8 |
| 415 | 42.8 | 42.9 | 42.8 |
| 416 | 42.8 | 42.9 | 42.7 |
| 417 | 42.8 | 42.9 | 42.7 |
| 418 | 42.8 | 42.8 | 42.7 |
| 419 | 42.7 | 42.8 | 42.7 |
| 420 | 42.7 | 42.8 | 42.7 |
| 421 | 42.7 | 42.8 | 42.7 |
| 422 | 42.7 | 42.8 | 42.7 |
| 423 | 42.7 | 42.8 | 42.7 |
| 424 | 42.7 | 42.8 | 42.6 |
| 425 | 42.7 | 42.8 | 42.6 |
| 426 | 42.7 | 42.8 | 42.6 |
| 427 | 42.7 | 42.7 | 42.6 |
| 428 | 42.6 | 42.7 | 42.6 |
| 429 | 42.6 | 42.7 | 42.6 |
| 430 | 42.6 | 42.7 | 42.6 |
| 431 | 42.6 | 42.7 | 42.6 |
| 432 | 42.6 | 42.7 | 42.6 |
| 433 | 42.6 | 42.7 | 42.5 |
| 434 | 42.6 | 42.7 | 42.5 |
| 435 | 42.6 | 42.7 | 42.5 |
| 436 | 42.6 | 42.7 | 42.5 |
| 437 | 42.6 | 42.6 | 42.5 |

TABLE 2-continued

| Wavelength (nm) | 1.5% Al-1 | 1.5% Al-2 | 1.5% Al-3 |
|---|---|---|---|
| 438 | 42.5 | 42.6 | 42.5 |
| 439 | 42.5 | 42.6 | 42.5 |
| 440 | 42.5 | 42.6 | 42.5 |
| 441 | 42.5 | 42.6 | 42.5 |
| 442 | 42.5 | 42.6 | 42.5 |
| 443 | 42.5 | 42.6 | 42.4 |
| 444 | 42.5 | 42.6 | 42.4 |
| 445 | 42.5 | 42.6 | 42.4 |
| 446 | 42.4 | 42.6 | 42.4 |
| 447 | 42.5 | 42.5 | 42.4 |
| 448 | 42.5 | 42.6 | 42.4 |
| 449 | 42.5 | 42.5 | 42.4 |
| 450 | 42.4 | 42.5 | 42.4 |

The data from Table 2 is shown in a graph in FIG. 5. Referring to FIG. 5, measurement of the average UV reflectivity 420 of a second thermoplastic composition provided the graph 410 showing percentage UV reflectance 412 as a function of wavelength in nm 414. The second thermoplastic composition was formed with a density of 1.0% aluminum microparticles having an average size of about 17 μm, in a polypropylene thermoplastic material homopolymer sold under the tradename PRO-FAX PD702 from POLY ONE (Northbrook, Ill.). The data for the average UV reflectivity 420 was obtained by averaging data from three samples, as provided in detail in Example 2 below. The UV reflectance 412 of three samples was measured from a wavelength of 250 nm to 450 nm. The UV reflectivity 420 reflectance at 254 nm 422 was about 39.4%. The average UV reflectivity 420 at points labeled in FIG. 5 was approximately: 38.5% at 250 nm 421, 39.6% at 260 nm at a first inflection point 423, 38.6% at 274 nm at a second inflection point 424, and 43.2% at 300 nm at a third inflection point 423. Accordingly, the second UV reflective thermoplastic composition provides UV reflectivity of at least 38% in the germicidal UV radiation range.

Prophetic Example 3

Figure 6:
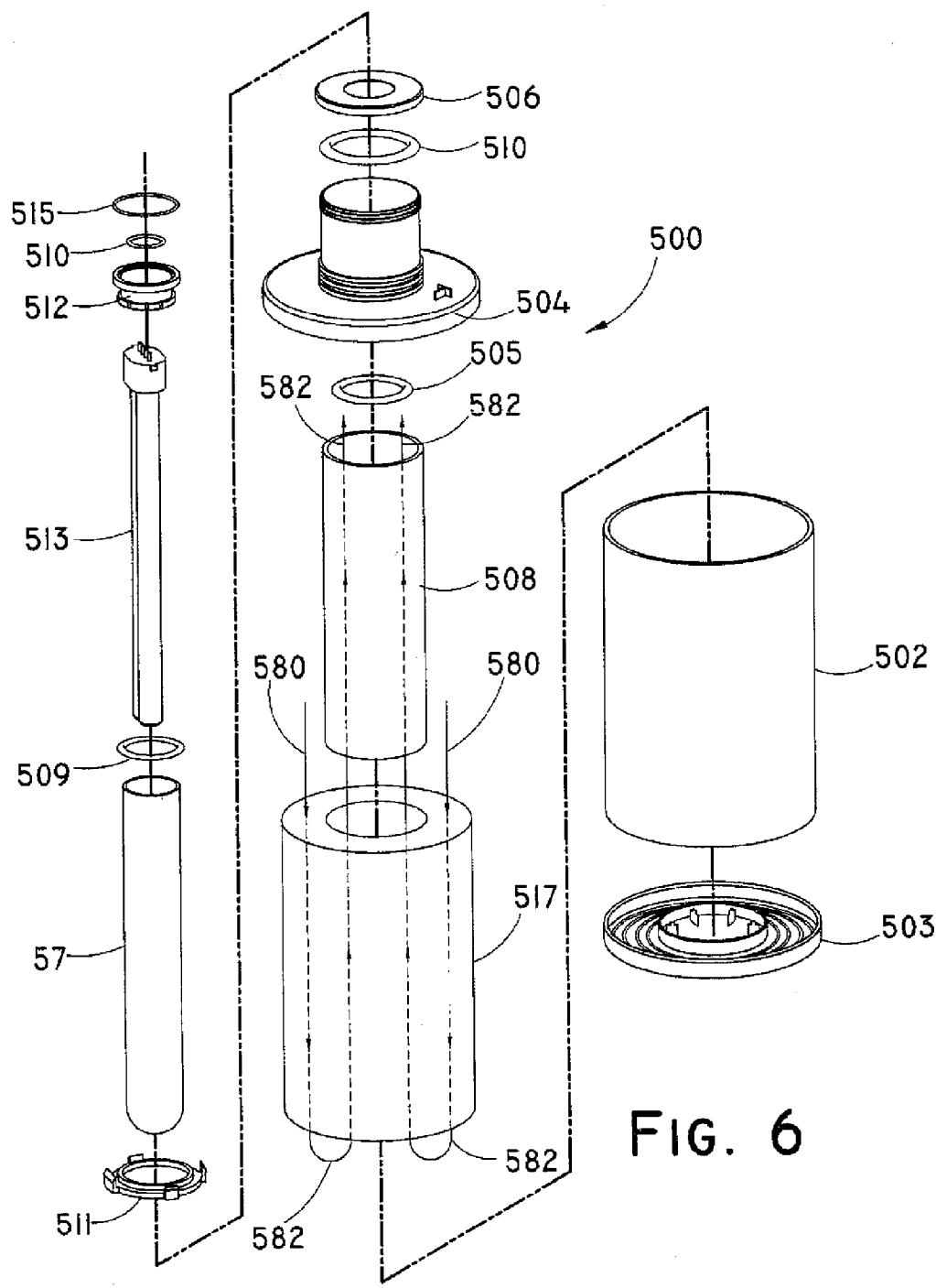
FIG. 6 is an exploded perspective view of a fourth UV lamp assembly configuration and a water filtration assembly.

A water Treatment System Filter and UV Lamp Assembly Comprising a UV-Reflective Al Flake Polypropylene Thermoplastic Composition FIG. 6 shows an engineering diagram of a UV lamp assembly comprising a UV-reflective thermoplastic composition having a UV reflective surface comprising Al microparticles in a thermoplastic polypropylene homopolymer. The UV lamp assembly provides for the UV radiation of a water sample as well as filtration of the water sample through a porous carbon filter. The thermoplastic composition is the composition from Example 1.

Specifically, the assembly 500 comprises a UV lamp 513 placed within a UV reflective tube 508 that is formed from the UV reflective composition of Example 1. The interior surface of the UV reflective tube 508 reflects UV radiation from the UV lamp 513 back toward the UV lamp. Untreated water enters the assembly 500 through the end cap opening 504. The untreated water flows radially outward and through a porous carbon filter block 517 in a first direction 580. The filtered water sample contacts an assembly end cap 503 upon exit from the carbon filter block 517, changes direction and flows in a second direction 582 through a UV reflective tube 508. The filtered water sample is irradiated by the UV lamp 513 within the UV reflective tube 508 while flowing in the second direction 582. The irradiated and filtered water leaves the assembly 500 through an opening in the end cap 506. A first end cap o-ring 505 and a second end cap o-ring 510 are also included in the assembly to seal the end cap region. A durable outer casing 502 encloses the porous carbon filter block 517, and the UV reflective tube 508. The UV lamp 513 is enclosed in a quartz containment chamber 57 sealed to a lamp end cap 512, with a first o-ring 509 and a second o-ring 514. The lamp end cap 512 is sealed to the assembly end cap 506 by a third o-ring 515. The quartz containment chamber 57 is secured in the UV reflective tube 516 by a first fitting 511. The UV lamp 513 is a Philips Model TUV PL-S 38W4P UV lamp operated at a voltage of 84.5V and a current of 450 mA.

What is claimed is:

1. A fluid treatment system comprising: an article of manufacture having an ultraviolet reflective surface, the ultraviolet reflective surface formed at least in part from a thermoplastic material containing from about 0.5% to about 5% UV reflective microparticles, the ultraviolet reflecting surface having a reflectivity of at least 30% of ultraviolet radiation at a wavelength of 254 nm.

2. The fluid treatment system of claim 1, where the thermoplastic material comprises polypropylene.

3. The fluid treatment system of claim 1, where the UV reflective microparticles are aluminum microparticles with an average size of between about 15 μm and about 55 μm.

4. The fluid treatment system of claim 1, where the UV reflective microparticles comprise aluminum and where the thermoplastic material comprises from about 1% to about 3% UV reflective microparticles.

5. The fluid treatment system of claim 1, where the thermoplastic material is a polypropylene homopolymer, the thermoplastic material comprising aluminum microparticles having an average size of between about 15 μm and about 55 μm.

6. The fluid treatment system of claim 1, where the thermoplastic material is a polypropylene homopolymer, and where the thermoplastic material comprises from about 1% to about 2% aluminum microparticles.

7. The fluid treatment system of claim 1, where the ultraviolet reflecting surface provides a reflectivity of at least 30% of ultraviolet light at a wavelength of 254 nm for a continuous period of ultraviolet light exposure of at least about 20 hours.

8. The fluid treatment system of claim 1, where the ultraviolet reflecting surface is characterized by a reflectivity of at least 30% of ultraviolet light at a wavelength of 254 nm for a period of continuous ultraviolet light exposure of about 20 hours to 40 hours.

9. The fluid treatment system of claim 1, where the thermoplastic material is a polypropylene homopolymer, where the thermoplastic material comprises from about 1% to about 2% aluminum UV reflective microparticles, and the aluminum UV reflective microparticles have an average size of between about 15 μm and about 55 μm.

10. The fluid treatment system of claim 1, further comprising an ultraviolet radiation emitting source, where at least a portion of the emitted ultraviolet radiation comprises a wavelength of 254 nm incident on at least a portion of the ultraviolet reflective surface.

11. The fluid treatment system of claim 1, further comprising a means for filtering the fluid.

12. The fluid treatment system of claim 1, where the article of manufacture comprises a fluid conduit defining an interior lumen and having an interior surface comprising the ultraviolet reflecting surface; and an ultraviolet radiation emitting source positioned within the interior lumen of the fluid conduit.

13. The fluid treatment system of claim 12, where a fluid conducting channel is formed between the interior surface and the ultraviolet radiation emitting source.

14. The fluid treatment system of claim 12, further comprising a water conducting conduit positioned between the interior surface and the ultraviolet radiation emitting source, where the water conducting conduit transmits ultraviolet radiation at a wavelength of 254 nm.

15. The fluid treatment system of claim 1, further comprising:
a fluid conduit having an interior surface comprising the ultraviolet reflecting surface, the fluid conduit defining an interior lumen; and
an ultraviolet radiation emitting source positioned within the interior lumen of the fluid conduit;
wherein a fluid conducting channel is formed between the interior surface and the ultraviolet radiation emitting source;
wherein the UV reflective microparticles comprise aluminum and have an average size of between about 15 mm and 55 mm; and
wherein the ultraviolet reflecting surface has a reflectivity of at least 30% of ultraviolet radiation at a wavelength of 254 nm during a continuous period of ultraviolet light exposure of about 20 hours to 40 hours.

16. A water treatment system comprising:
a. a water conduit having an interior surface, where at least a portion of the interior surface is an ultraviolet reflective surface formed at least in part from a thermoplastic material containing from about 0.5% to about 5% aluminum microparticles, the ultraviolet reflecting surface having a reflectivity of at least 30% of ultraviolet light having a wavelength of 254 nm;
b. a UV radiation source positioned within the water conduit, the UV radiation source comprising an ultraviolet radiation emitting source having an energized state and configured to emit ultraviolet light when the UV radiation source is in the energized state, where the emitted ultraviolet light includes light at a wavelength of 254 nm.

17. The water treatment system of claim 15, where the water conduit comprises: a polypropylene homopolymer and the aluminum microparticles have an average size of between about 15 μm and about 55 μm.

18. The water treatment system of claim 15, where the ultraviolet reflective surface is configured to contact water during operation of the water treatment system, and where less than 1.0 ppb of aluminum is detected in a water sample after contacting the water sample with the ultraviolet reflective surface for at least 40 hours; and where the ultraviolet reflecting surface is characterized by a reflectivity of at least 30% of the ultraviolet light at a wavelength of 254 nm for a period of continuous ultraviolet light exposure of at least 10 hours.

19. The water treatment system of claim 15, where the UV radiation source is a bulb having a power of at least 10W in the energized state.

20. A water treatment system comprising:
a. a water conduit having an interior surface, where at least a portion of the interior surface is an ultraviolet reflective surface formed at least in part from a polypropylene containing from about 1% to about 2% aluminum microparticles having an average size of between about 15 μm and about 55 μm, the ultraviolet reflecting surface characterized by a reflectivity of at least 30% of ultraviolet light having a wavelength of 254 nm;
b. a UV radiation source positioned within the water conduit, the UV radiation source comprising an ultraviolet emitting light source having an energized state and emitting ultraviolet light when the UV radiation source is in the energized state, where the emitted ultraviolet light includes light at a wavelength of 254 nm.

* * * * *